United States Patent
Luong et al.

(10) Patent No.: US 11,871,213 B2
(45) Date of Patent: Jan. 9, 2024

(54) ADAPTIVE NR UNLICENSED SPECTRUM SHARING AND TRANSMISSION MECHANISM FOR DIFFERENT CHANNEL ACCESS PRIORITIES

(71) Applicant: InterDigital Patent Holdings, Inc., Wilmington, DE (US)

(72) Inventors: Phuong Luong, Mont-Royal (CA); J. Patrick Tooher, Montreal (CA); Paul Marinier, Brossard (CA)

(73) Assignee: INTERDIGITAL PATENT HOLDINGS, INC., Wilmington, DE (US)

(*) Notice: Subject to any disclaimer, the term of this patent is extended or adjusted under 35 U.S.C. 154(b) by 329 days.

(21) Appl. No.: 17/295,339

(22) PCT Filed: Nov. 22, 2019

(86) PCT No.: PCT/US2019/062773
§ 371 (c)(1),
(2) Date: May 19, 2021

(87) PCT Pub. No.: WO2020/112534
PCT Pub. Date: Jun. 4, 2020

(65) Prior Publication Data
US 2021/0392506 A1 Dec. 16, 2021

Related U.S. Application Data

(60) Provisional application No. 62/773,332, filed on Nov. 30, 2018.

(51) Int. Cl.
*H04W 16/14* (2009.01)
*H04W 76/36* (2018.01)
(Continued)

(52) U.S. Cl.
CPC ....... *H04W 16/14* (2013.01); *H04W 28/0268* (2013.01); *H04W 74/006* (2013.01);
(Continued)

(58) Field of Classification Search
CPC ............. H04W 16/14; H04W 28/0268; H04W 74/006; H04W 74/0875; H04W 76/36; H04W 74/0808
See application file for complete search history.

(56) References Cited

U.S. PATENT DOCUMENTS

2016/0212625 A1   7/2016  Damnjanovic et al.
2016/0366689 A1   12/2016 Zhang et al.
(Continued)

FOREIGN PATENT DOCUMENTS

CN   107852746 A    3/2018
EP     3211953 A1   8/2017
KR   20180057755 A  5/2018

OTHER PUBLICATIONS

Anonymous, "Part 16: Air Interface for Fixed Broadband Wireless Access Systems", IEEE Computer Society and the IEEE Microwave Theory and Techniques Society, IEEE Standard for Local and Metropolitan Area Networks, Document: IEEE Std 802.16-2004, Oct. 1, 2004, 893 pages.
(Continued)

*Primary Examiner* — Jae Y Lee
(74) *Attorney, Agent, or Firm* — VOLPE KOENIG

(57) ABSTRACT

Methods and apparatuses are described herein for spectrum sharing and transmission mechanisms for different channel access priorities. For example, a wireless transmit/receive unit (WTRU) may be configured as either a high priority (HP) WTRU or a low priority (LP) WTRU, wherein a HP WTRU is configured to use a first channel access method for accessing the set of network resources and a LP WTRU is
(Continued)

configured to use a second channel access method for accessing the same set of network resources, the second channel access method having a lower priority than the first channel access method. A set of protected network resources may be scheduled within the set of network resources for being accessed by the LP unit (e.g., over a limited period of time) with fewer channel access restrictions (e.g., with a higher priority channel access method than in any unprotected network resources).

20 Claims, 13 Drawing Sheets

(51) Int. Cl.
*H04W 28/02* (2009.01)
*H04W 74/00* (2009.01)
*H04W 74/08* (2009.01)

(52) U.S. Cl.
CPC ....... *H04W 74/0875* (2013.01); *H04W 76/36* (2018.02); *H04W 74/0808* (2013.01)

(56) References Cited

U.S. PATENT DOCUMENTS

| | | | |
|---|---|---|---|
| 2017/0238342 A1 | 8/2017 | Yang et al. | |
| 2018/0295523 A1 | 10/2018 | Mallik et al. | |
| 2021/0235532 A1* | 7/2021 | Wu | H04W 36/00837 |
| 2021/0345363 A1* | 11/2021 | Zhang | H04W 72/543 |

OTHER PUBLICATIONS

Anonymous, "Mobile Station-Base Station Compatibilty Standard for Dual-Mode Wideband Spread Spectrum Cellular System", Telecommunication Industry Association, TIA/EIA Interim Standard, Document: TIA/EIA/IS-95-A (Addendum to TIA/EIA/IS-95), May 1995, 678 pages.

Anonymous, "Part 11: Wireless LAN Medium Access Control (MAC) and Physical Layer (PHY) Specifications, Amendment 4: Enhancements for Very High Throughput for Operation in Bands below 6 GHz", IEEE Computer Society, IEEE Standards Association, Document IEEE Std 802.11ac-2013, Dec. 11, 2013, 425 pages.

Anonymous, "Part 15.1: Wireless Medium Access Control (MAC) and Physical Layer (PHY) Specifications for Wireless Personal Area Networks (WPANS)", IEEE Standard for Wireless MAC and PHY, Document: IEEE Std 802.15.1-2002, Jun. 14, 2002, 5 pages.

Anonymous, "Part 11: Wireless LAN Medium Access Control (MAC) and Physical Layer (PHY) Specifications; Amendment 5: Enhancements for Higher Throughput", IEEE Computer Society, Document: IEEE Std 802.11n-2009, Sep. 11, 2009, 534 pages.

Anonymous, "Part 11: Wireless LAN Medium Access Control (MAC) and Physical Layer (PHY) Specifications", IEEE Computer Society, Document: IEEE Std 802.11-2012, Mar. 29, 2012, 2793 pages.

Anonymous, "Part 11: Wireless LAN Medium Access Control (MAC) and Physical Layer (PHY) Specifications; Amendment 2: Sub 1 GHz License Exempt Operation", IEEE Computer Society, Document: IEEE Std 802.11-2016, Dec. 7, 2016, 594 pages.

Anonymous, "Part 11: Wireless LAN Medium Access Control (MAC) and Physical Layer (PHY) Specifications; Amendment 5: Television White Spaces (TVWS) Operation", IEEE Computer Society, Document: IEEE Std 802.11-2013, Dec. 11, 2013, 198 pages.

Anonymous, "Study on NR-based Access to Unlicensed Spectrum", 3rd Generation Partnership Project (3GPP), 3GPP TSG RAN Meeting #77, Document: RP-172021, Sapporo, Japan, Sep. 11, 2017, 5 pages.

* cited by examiner

ADAPTIVE NR UNLICENSED SPECTRUM SHARING AND TRANSMISSION MECHANISM FOR DIFFERENT CHANNEL ACCESS PRIORITIES

This application claims the benefit, under 35 U.S.C. § 371 of International Application PCT/US2019/062773, filed Nov. 22, 2019, which was published in accordance with PCT Article 21(2) on Jun. 4, 2020, in English, and which claims the benefit of U.S. Patent Application No. 62/773,332, filed Nov. 30, 2018.

BACKGROUND

Network operators may operate in partially licensed or shared spectrum where each operator may be assigned different levels of access priorities on a same block of spectrum. For example, a high priority (HP) network may have privileged access to the shared unlicensed spectrum and a low priority (LP) network or devices may be allowed to access the spectrum opportunistically. In this example, when HP and LP operator networks directly compete with each other for access to the channel, if there is no coordination, the HP operator may exclusively occupy the unlicensed channel and the LP operator may be prevented from accessing the unlicensed channel. This may enable a reduction in co-channel interference and enable high data for the HP network. However, this may also result in a complete inability of low priority devices to access the channel. Therefore, a mechanism is needed to enable the LP network to coordinate with the HP network to achieve some level of acceptable low-priority channel access.

SUMMARY

Methods and apparatuses are described herein for spectrum sharing and transmission mechanisms for different channel access priorities. For example, a wireless transmit/receive unit (WTRU) may be configured as any of a high priority (HP) WTRU or a low priority (LP) WTRU, wherein a HP WTRU may be configured to use a first channel access method for accessing the set of network resources and a LP WTRU may be configured to use a second channel access method for accessing the same set of network resources, the second channel access method having a lower priority than the first channel access method. A set of protected network resources may be scheduled within the set of network resources for being fairly shared between the LP WTRU and any other HP wireless device competing for the same set of network resources. Fair sharing of a set of protected network resources between a HP unit and a LP unit may, for example, be achieved by allowing the LP unit to access a subset of the network resources (e.g., over a limited period of time) with fewer channel access restrictions (e.g., with a higher priority channel access method than for any unprotected network resources).

BRIEF DESCRIPTION OF THE DRAWINGS

A more detailed understanding may be had from the following description, given by way of example in conjunction with the accompanying drawing, wherein like reference numerals in the figures indicate like elements, and wherein.

DETAILED DESCRIPTION

Example Networks for Implementation of the Embodiments

Figure 1A:
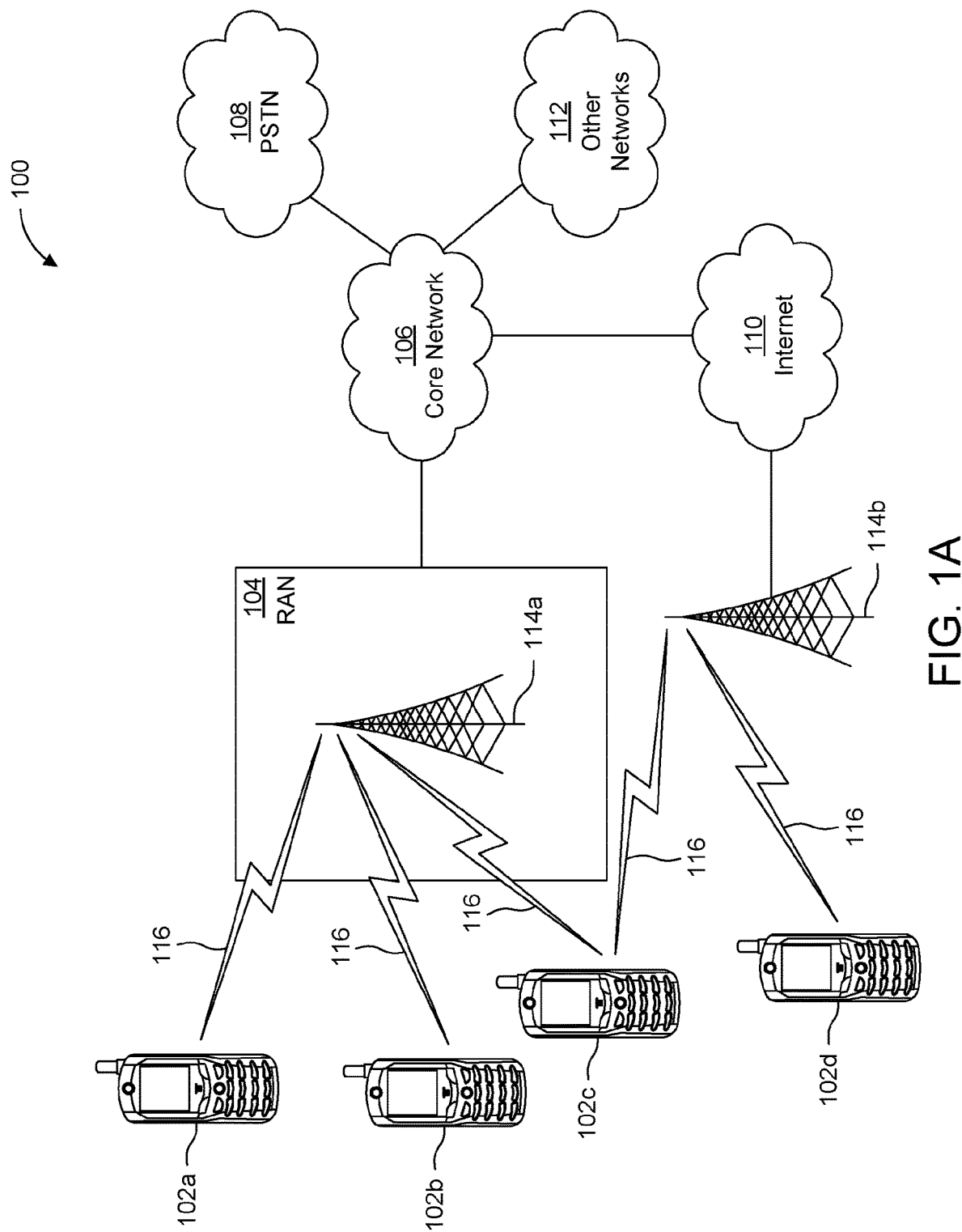
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
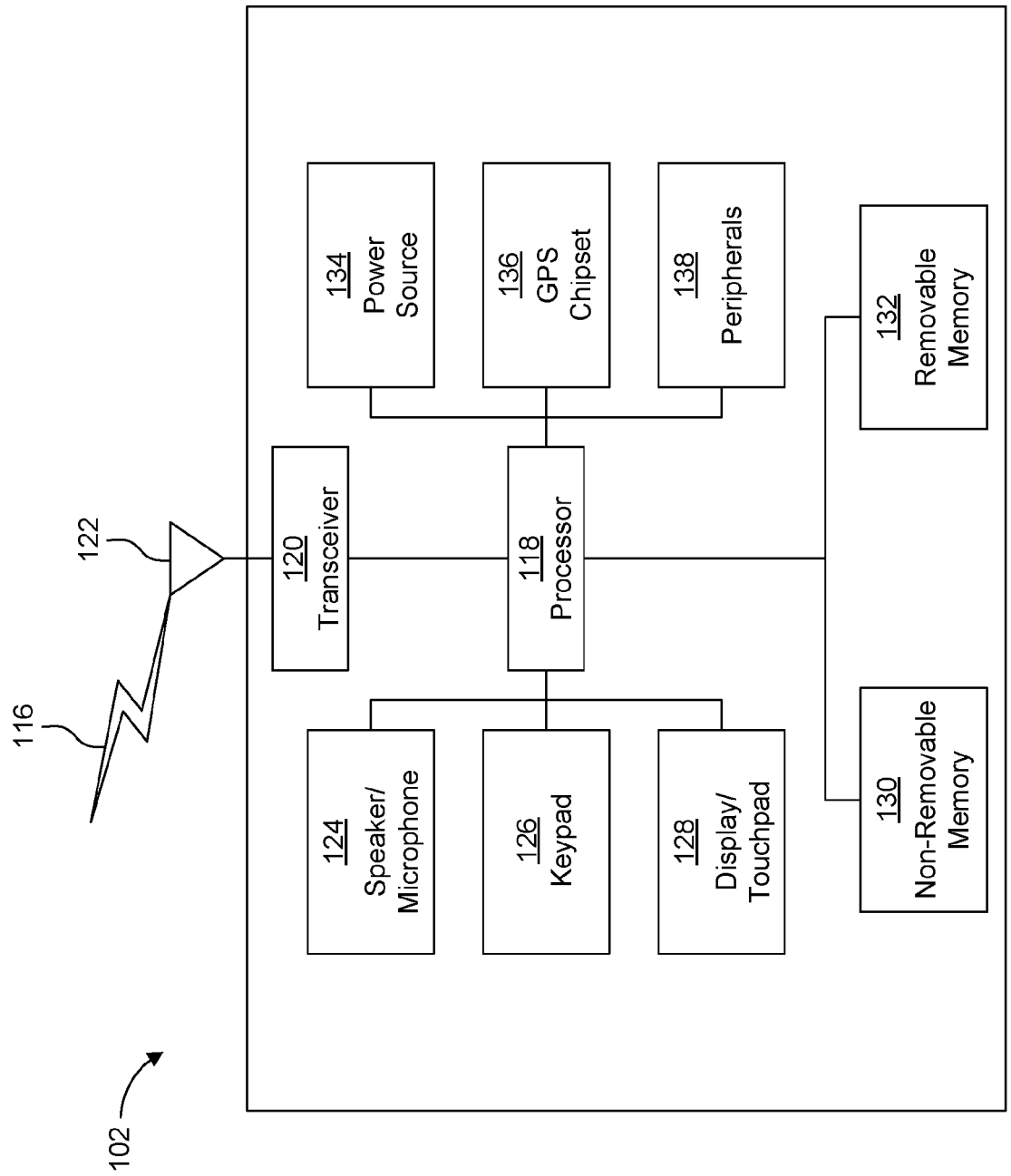
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

Figure 1C:
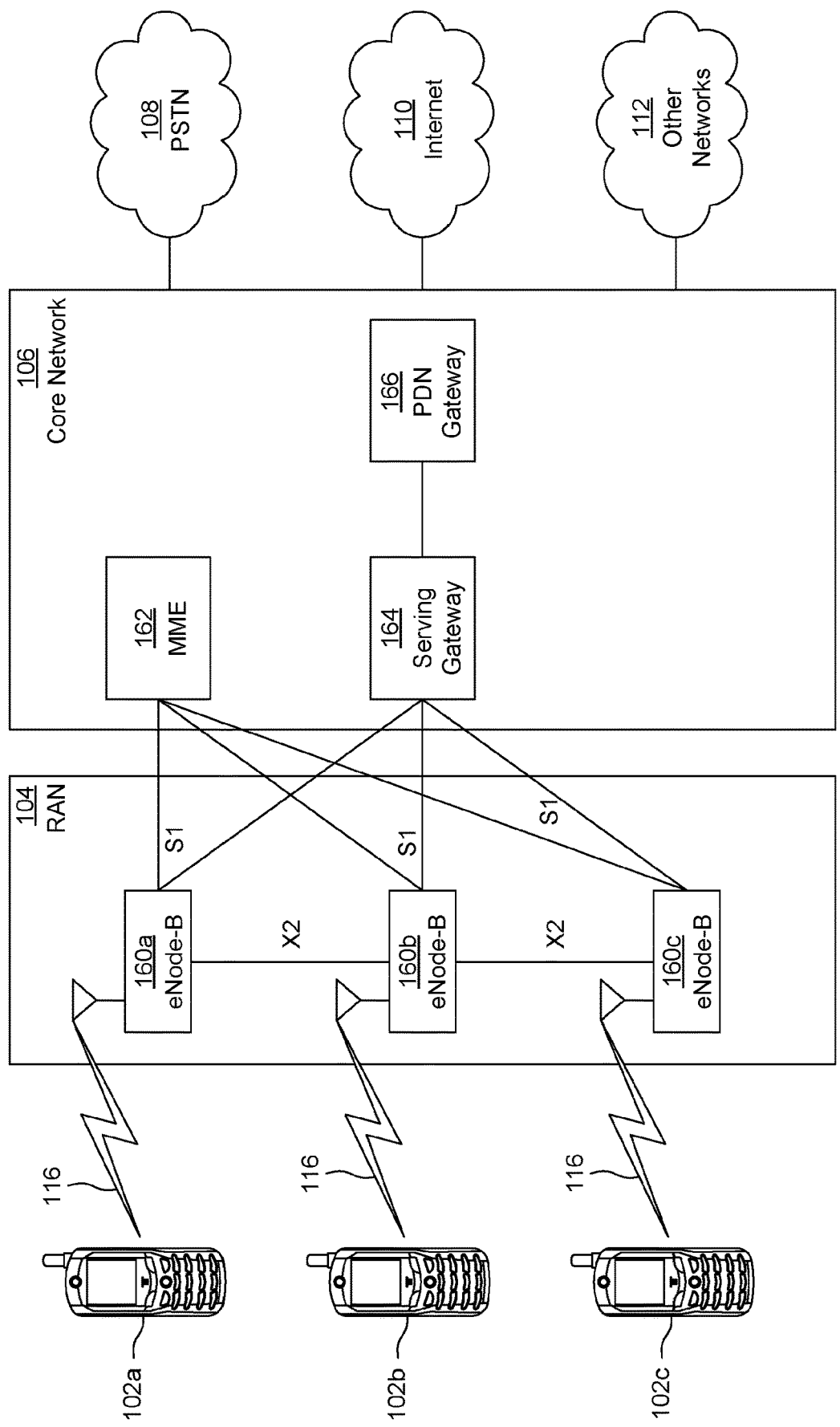
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11 ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.1 1ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
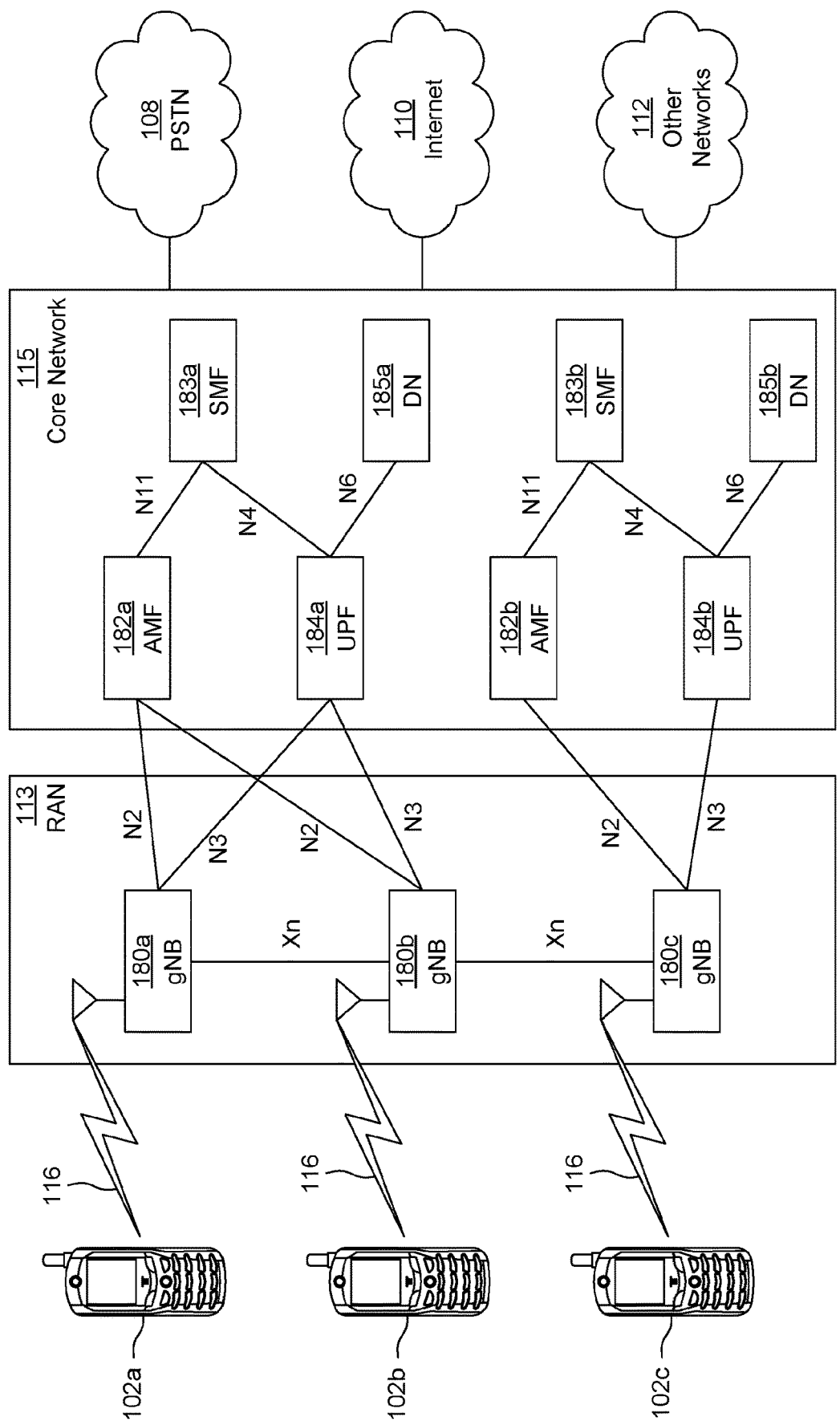
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Channel Access in Shared Spectrum

The listen-before-talk (LBT) procedure is a mechanism by which a piece of equipment applies a clear channel assessment (CCA) check before using the channel for transmission. The CCA may utilize at least energy detection to determine the presence or absence of other signals on a channel in order to determine whether the channel is occupied or clear. CCA may be viewed as a channel acquisition mechanism that takes place before a use of the channel for transmission. CCA is an example of a preliminary channel acquisition mechanism. The use of LBT may generally be expected in the unlicensed bands by various national regulations to provide fair coexistence between multiple pieces of equipment. Carrier sensing via LBT is one possible way for fair sharing of the unlicensed spectrum between various pieces of equipment. LBT may provide fair and friendly operation of multiple pieces of equipment in any part of the channel spectrum, including the unlicensed spectrum.

Figure 2:
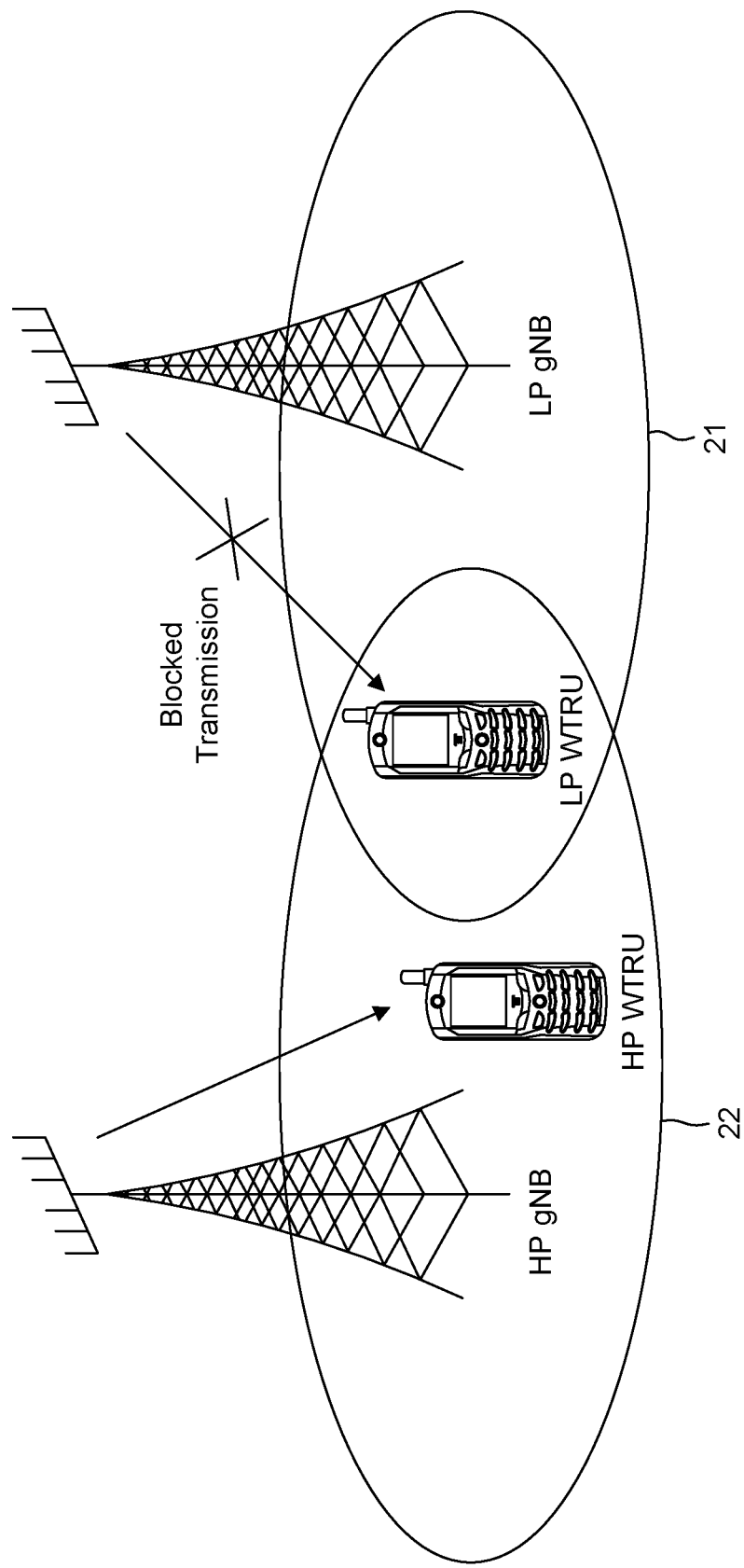
FIG. 2 illustrates an example of coexistence issues occurring between RANs with different channel access priorities.

FIG. 2 illustrates an example of a coexistence issue occurring between two 5G radio access networks with different channel access priorities. Network operators may operate in partially licensed or shared spectrum where each operator may be assigned different levels of access priorities on a same block of spectrum. A High Priority (HP) network operated by a HP network operator comprises various pieces of network equipment including at least WTRUs and gNBs, which may be referred to herein as HP WTRUs and HP gNBs. Similarly a Low Priority (LP) network operated by a LP network operator comprises various pieces of network equipment including at least WTRUs and gNBs, which may be referred to herein as LP WTRUs and LP gNBs. For the sake of clarity and without loss of generality, embodiments are described herein using 5G WTRUs and gNBs as wireless base stations, but the embodiments described herein may be applicable to any kind of WTRUs and any kind of wireless base stations.

According to the exemplary situation illustrated in FIG. 2, a HP network 22 may have privileged access to the shared unlicensed spectrum and a LP network 21 may be allowed to access the spectrum (e.g., only) opportunistically. When HP 22 and LP 21 networks directly compete with each other for access to the channel, if there is no coordination, the HP network 22 may exclusively occupy the unlicensed channel and the LP network 21 may be prevented from accessing the unlicensed channel. This may enable a reduction in co-channel interference and enable high data for the HP network 22. However, such a scenario may result in a (e.g., complete) inability of LP WTRUs to access the channel. Embodiments described herein may enable the LP network 21 to coordinate with the HP network 22 to achieve some level of (e.g., acceptable) low-priority channel access probability.

Simultaneous use of the same unlicensed spectrum may lead to (e.g., strong) interference between the coexisting HP and LP networks, for example, due to the hidden, exposed or deafness terminal problems. This may (e.g., significantly) reduce the efficiency of spectrum utilization expected for the HP network. Embodiments described herein may allow to handle the spectrum sharing among networks with different channel access priorities in 5G deployments.

HP and LP Configuration Modes

According to embodiments, a WTRU may be configured as either a LP WTRU or a HP WTRU, wherein a set of protected network resources may be scheduled within a set of network resources for being fairly shared between the LP WTRU and any other HP wireless device such as, for example, any of a HP WTRU and a HP gNB, competing for the same set of network resources. The set of network resources may be, for example, and without limitation, a set of radio frequency bands, but the embodiments described herein may be applicable to any set of network resources to be shared between network devices. The WTRU may be configured in an operation mode being either a HP or a LP operation mode for accessing a (e.g., given) set of network resources. The configuration, or operation mode, may indicate to the WTRU the channel access method to use and the network resources to use with that channel access method.

According to embodiments, a WTRU may be configured with a first channel access method applicable to (e.g., for accessing) a first set of (e.g., network) resources in a first set of time instances and with a second channel access method applicable to (e.g., for accessing) a second set of (e.g., network) resources in a second set of time instances, the second channel access method being of higher (e.g., channel access) priority than the first channel access method. For example a HP WTRU and a LP WTRU may be configured similarly (e.g., each with a both a first and a second channel access methods for respectively accessing a first and a second sets of (e.g., network) resources in respectively a first and a second sets of time instances). The network may configure a WTRU as a HP WTRU by configuring the WTRU with (e.g., specific) channel access methods different from those with which another (e.g., LP) WTRU may be configured.

In a first example, a WTRU configured in HP mode may be configured to use a set of network resources for transmission with a first channel access method and a WTRU configured in LP mode may be configured to use the same set of network resources for transmission with a second channel access method, the second channel access method being of lower priority than the first channel access method. A set of protected resources (e.g., the second set of resources) may be scheduled within the common set of network resources for being fairly shared between LP and HP units despite the second channel access method being of lower priority than the first channel access method. Fair sharing of a network resource between a HP unit and a LP unit may be, for example, obtained by allowing the LP unit to access a subset of the network resources (e.g., the second set of resources), for example, during a (e.g., limited) period of time (e.g., the second set of time instances), which may be referred to herein as a protected duration, with fewer channel access restrictions (e.g., with a higher priority channel access method).

In a second example, from a High Priority perspective, a HP WTRU may not perform (e.g., require) any preliminary channel access acquisition mechanism such as a preliminary clear channel assessment check before transmission in a first set of resources and may perform (e.g., require) a high priority channel access acquisition mechanism when transmitting in a second set of resources. Accessing the channel for transmission without any preliminary channel acquisition mechanism such as channel listening (such as CCA) is of higher priority than any high priority channel access including a preliminary channel listening (such as CCA). From a Low Priority perspective, a LP WTRU may perform (e.g., require) a high priority channel access mechanism in the first set of resources and a low priority channel access mechanism in a second set of resources.

More generally, a WTRU configured in a HP mode may be configured to use a first set of network resources for transmission with a first channel access method, and to use a second set of network resources for transmission with a second channel access method. A WTRU configured in LP mode may be configured to use the same first set of network resources for transmission with a third channel access method, and to use the same second set of network resources for transmission with a fourth channel access method, the third channel access method having lower priority than the first channel access method and/or the fourth channel access method having lower priority than the second channel access method. A set of protected resources may be scheduled within the first and/or the second set of network resources for being fairly shared between LP and HP units despite the third and/or the fourth channel access methods being of lower priority than respectively the first and/or the second channel access methods.

In a first variant, the configuration mode may be hard coded in the WTRU. In a second variant, the configuration mode may be received from the network, for example, from the WTRU's serving gNB via a configuration message. The configuration message may be, for example, received via any of a Radio Link Control (RLC) message, a broadcast transmission, and a Downlink Control Information (DCI) transmission.

According to embodiments, a HP gNB and a LP gNB may coordinate through a backhaul link, allowing synchronization and time alignment. A backhaul link may be any kind of network connection interconnecting the HP gNB and the LP gNB and capable of synchronizing the HP LP gNBs. The HP gNB may operate in a privileged mode to access the channel. For example, the HP gNB or HP WTRUs may access the channel using LBT with a set of parameters enabling a faster access to the channel than for other LP gNBs and LP WTRUs. As previously described, performing LBT comprises sensing a channel and comparing a received energy to a value before deciding to either transmit or possibly sense the channel again. LBT may be performed with different priority levels associated with different parameters. A first parameter may include a contention window size. An integer may be taken within the contention window to determine the number of CCA slots to be listened to. The larger the contention window, the longer a WTRU and/or a gNB may (e.g., need to) listen to the channel before transmission, and the lower the priority of the LBT. A second parameter may include the energy value above which the channel may be considered to be occupied. The lower the second parameter, the lower the priority. A third parameter may include the time value by which a further CCA may be started in case an initial CCA failed to acquire the channel. The higher the third parameter, the lower the priority. By combining any of the first, second and third parameters, multiple priority levels of LBT may be used, wherein the priority levels may be ordered from lower to higher priorities depending on their probability of successfully acquiring the channel. The lowest priority LBT may correspond, for example, to default values for each of the LBT parameters, and is herein termed full LBT.

HP Channel Access Methods

A first example of a HP channel access method that mat be used by a HP gNB and/or HP WTRUs is a LBT with high priority parameters, referred to herein as HP LBT. For example, the channel access priority class may be determined based on the fact that the gNB and/or the WTRUs associated with it are high priority. Any set of LBT parameters making the HP LBT of higher priority than the full LBT may be applicable to embodiments described herein.

A second example of a HP channel access method that may be used by a HP gNB and/or HP WTRUs is a LBT with middle priority parameters, referred to herein as MP LBT. Any set of parameters making the MP LBT of higher priority than the full LBT, but of lower priority than the HP LBT may be applicable to embodiments described herein. Although embodiments are described herein with two levels (HP, MP) of LBT associated with two sets of parameters, any number of LBT channel methods associated with different sets of parameters may be applicable to embodiments described herein.

A third example of a HP channel access method that may be used by a HP gNB and/or HP WTRUs is a single observation window LBT, where the transmitting unit may perform channel sensing in a single observation window and evaluate any detected energy against a high priority energy detection value. The channel may be checked (e.g., only once) for channel occupancy detection purposes and (e.g., any) detected energy value may be compared to a relatively high value of energy to determine whether the channel is busy (above the value) or free (below the value). A relatively high value may correspond to the highest possible value of the second parameter of the LBT. A relatively high value may also correspond to any of two or three highest possible values of the second parameter of the LBT. If the channel is considered busy during the (e.g., single) observation window, the (e.g., single) observation window LBT may stop without performing any further channel sensing in any further observation window.

A fourth example of a HP channel access method that may be used by a HP gNB and/or HP WTRUs is a transmission using (e.g., specific) resources without any preliminary channel access acquisition mechanism such as, for example, any CCA variant. (E.g., specific) resources may be, for example, any of time instances, frequency resources and spatial resources. Such specific resources may be configurable according to any configuration mechanism or may be dynamically requested to a gNB according to any Radio Resource Control (RRC) protocol.

A fifth example of a HP channel access method that may be used by a HP gNB and/or HP WTRUs is a transmission of a pre-emption signal followed by a subsequent transmission. The transmission of a pre-emption signal by a HP unit (gNB and/or WTRUs) may indicate to (e.g., all) LP units (gNB and/or WTRUs) to stop transmission so that the HP unit may (e.g., immediately) access the channel for transmission without interfering with any LP gNB and/or LP WTRUs.

LP Channel Access Methods

According to embodiments, a LP gNB and/or LP WTRUs may use a channel access method of lower priority than any channel access method used by a HP gNB and/or HP WTRUs for using a same set of resources for transmission.

A first example of a LP channel access method that may be used by a LP gNB and/or LP WTRUs is a LBT with middle priority parameters for accessing a given set of resources. In that case, a HP channel access method for accessing the same set of resources may be, for example, any of the HP LBT, the single observation window LBT, the direct channel access without any preliminary channel acquisition, and the pre-emption signal transmission.

A second example of a LP channel access method is full LBT. In that second example, the LP gNB and/or LP WTRUs are allowed to transmit only if the channel has been acquired using full LBT, which also corresponds to a lowest priority LBT.

In another example, LP gNB or LP WTRUs may only transmit if they have not received a pre-emption indication from a HP WTRU or HP gNB preceding a transmission. If no pre-emption indication has been received, the LP gNB or LP WTRUs may be allowed to transmit using any of a MP LBT or a full LBT channel access method depending on the configuration. This may prevent a LP network from accessing the channel. In order to obtain the channel for transmission, a LP network may enter a negotiation or coordination mode with one or more HP network(s).

LP and HP Networks Coordination: Requesting Resources by the LP Network

The LP network may, for example, make a request for channel access and/or resources to one or more HP networks, and the HP networks may determine whether to grant the LP network channel access occasions and/or resources. In this negotiation or coordination mode, a LP gNB may send (e.g., transmit) a request message (e.g. via an X2 interface) to the one or more HP networks. Without limitation, the request message may include any of an amount of requested resources, a duration, a share factor, a direction (downlink only, uplink only or bidirectional), and a price the LP network is willing to pay for the resources. The LP network may request (e.g., transmit a message requesting) a set of resources (time and/or frequency and/or spatial resources) for transmission. Such resources may be tied to a specific channel access method. For example, the LP network may request resources which may be used (e.g., only) with a certain type of LBT channel access method. In another example, the LP network may request (e.g., transmit a message requesting) resources which may be used for transmission without (e.g., needing) any preliminary CCA. In yet another example, the LP network may request (e.g., transmit a message requesting) resources on which it may (e.g., always) monitor for a pre-emption signal from the one or more HP networks, and the LP network may use the requested resource for transmission (e.g., only) if no pre-emption signal is received from the HP networks for the requested resources. The LP network may also request (e.g., only) a share or percentage of resources (possibly from a configurable set of resources). In such a case, the LP network may operate on the configurable set of resources with limited restraints (e.g. limited channel access restrictions) until the share or percentage is reached. Such share or percentage may be reset periodically or semi-statically. For example, the LP gNB may repeatedly send request messages to the one or more HP networks on a regular basis. In another example, the LP gNB may send request messages (e.g., only) when transmissions are expected to occur. Any mechanism for sending request messages by a LP gNB to a HP network may be applicable to embodiments described herein.

LP and HP Networks Coordination: Allocating Resources by the HP Network

The HP gNB having received a request message for resources from a neighboring LP gNB may use the information provided in the request message combined with its own policies as inputs to decide whether it is willing to allocate the spectrum for the LP network or not. The HP gNB may reply to the request message with a signaling response message indicating whether it accepts the request as it is, accepts the request with modifications or rejects the request. The signaling response message may be transmitted via an X2 interface. In another example, the signaling response message transmitted by the HP network may be broadcasted. Such a broadcasted signaling response message may be received by any number of LP (or HP) networks and may enable multiple LP networks to acquire resources. The signaling response message may also enable multiple HP networks to (e.g., better) coordinate their channel access. When broadcasted, the signaling response message may indicate the identity of the LP network which made the request or for whom the resources are released by the HP network. This may in effect grant a LP network with higher priority access to a subset of resources (e.g. higher priority than other LP networks).

The signaling response message of channel reservation sent from a HP network to a LP network may indicate a protected period of time (e.g., a second set of time instances) during which the HP network may allow at least a subset of resources (e.g., a second set of resources) to be used by one or more LP networks with LP channel access methods, with fewer channel restrictions (e.g., higher priority) than outside of the protected period of time (e.g., higher priority than a full LBT). In other words, the signaling response may indicate a (e.g., second, sub) set of resources scheduled in a (e.g., second) set of time instances (e.g., corresponding to the protected period of time). The signaling response message may include a starting and an ending point of the protected period of time. The protected period of time may be, for example, any of a set of successive symbols, time slots, time instances, and resource blocks. Any technique for representing a period of time during which resources are allowed to be accessed by LP networks channel access methods of higher priority may be applicable to embodiments described herein. The protected periods of time may be defined in a periodic manner and may repeat in time. For example, a plurality of such protected periods of time may occur, with a same time interval separating two successive protected periods of time. In another example, repeated protected periods of time may occur separated with varying time intervals. Any technique for repeating protected periods of time may be applicable to embodiments described herein.

The signaling response message may further include a duration indicating when a repeated protected period of time may expire. In other words, after this duration, if a LP network does not send any other request message or update their request messages, a HP gNB may cancel the channel reservation for future frames. Prior to the expiration of the channel reservation duration, an LP network may request an extension of the duration. If the duration expires without a request for extension from an LP network, a new (e.g. complete) request message for protected resources may be sent for requesting a protected period of time again. The duration may be used by the LP gNB and/or LP WTRUs as a time reference to determine when they may expect the reserved slots to be modified.

The signaling response message may further include subframe indexes or slot patterns of protected periods of time. The signaling response message may further include the set of resources that may be protected in the protected period of time such as any of a set of symbols, frequencies, resource blocks and spatial resources. The signaling response message may further include the channel access method to be used by the LP gNB and/or LP WTRUs for accessing the protected resources of the protected period of time. The signaling response message may further include an identifier of the LP network for which the signaling response message is valid. The identifier may, for example, identify any number of LP networks. In another example, the identifier may identify any number of LP network units (such as a LP gNB and/or LP WTRUs). In yet another example, the signaling response message may not include any identifier, or may include a generic identifier, which may indicate that (e.g., all) LP networks are allowed to share (e.g., access) the protected resources with a higher priority than other (e.g., non-protected) resources.

Scheduling a Set of Protected Resources: Protected Duration

According to embodiments, the HP network may reply to the request message sent by the LP network. The HP network may schedule a portion of a reserved channel (e.g., a specific set of time instances), which may be referred to herein as a protected period of time or a protected duration. The protected duration, for example corresponds to a set of time instances during which a WTRU is configured to access a set of (e.g., network) resources with a (e.g., specific) channel access method. The protected duration may be a period of time during which a LP unit (e.g., any of a LP WTRU and a LP gNB) may be configured to transmit data with a channel access method of higher priority than the channel access method used by the LP unit outside of that period of time. For example, the channel access method used by a LP unit during a protected duration may be of a same priority than a channel access method used by a HP unit for the same network resources. The protected duration is applicable to a set of resource for a period of time which is scheduled or configured ahead of time and which is available to any number of LP units and/or HP unit, which may contend for the channel. It is different from a period of time managed by a polling mechanism where each unit would be polled for transmission by receiving a polling token. A LP unit may access a network resource for transmitting data in a protected duration according to the scheduled resources independently of (e.g., without) receiving any (e.g., dedicated, polling) message inviting the LP unit to transmit (e.g., immediately) after the reception of the polling message Thus, embodiments described herein allow to reduce the network overhead for a successful transmission. Furthermore, unlike the polling method, it may be possible for any of a LP and HP unit to transmit data at any time, inside or outside of a protected duration. The timing of the transmission (e.g., whether inside or outside of the protected duration) may be used by any of the LP and HP unit to determine the channel access priority or LBT type or LBT category associated with the transmission. A channel reservation mechanism may be used, in which the protected duration and the repeated occurrence of the protected durations (e.g., the periodicity of the protected duration) may vary and depend on the on-demand requests and the coordination between HP and LP networks.

Figure 3:
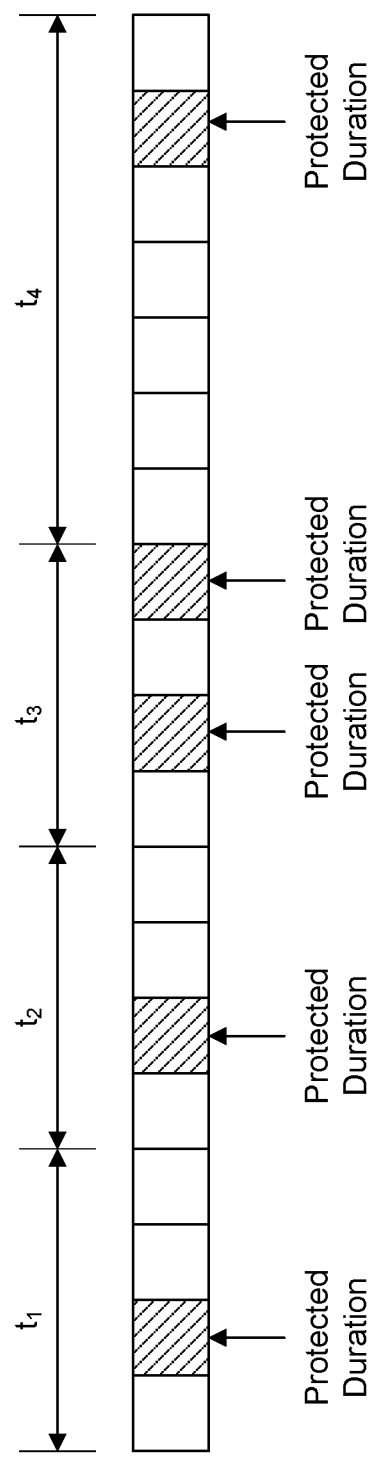
FIG. 3 illustrates an example of successive protected durations with varying resource reservations according to an embodiment.

FIG. 3 illustrates an example of successive protected durations with varying resource reservations. According to a request message received from a LP gNB, the HP gNB may reserve a certain amount of spectrum resources, e.g., one slot in every n slots for a duration of time t1. After t1, if the HP gNB receives another request message (e.g., a request to continue with the current sharing mechanism or a request for modifications of the sharing mechanism, possibly asking for additional resources), it may maintain the set of protected resources for a time duration t2. Based on the same or another request message, the HP network may modify the set of protected resources as depicted in FIG. 3, where the HP gNB may provide two protected slots per n slots for a duration of t3. Inversely, if the HP gNB does not receive any request message from the LP network or if it does not accept a new request message of the LP network, it may cancel the protected periods of time for a certain time duration.

According to embodiments, the HP gNB providing the protected resources may broadcast the configuration information of protected resources. This may enable any of LP gNBs and LP WTRUs to determine when they may (e.g., opportunistically) acquire the channel for transmissions (possibly also to determine the channel access method for such protected resources). LP WTRUs may, for example, be configured to monitor broadcast transmissions from at least one HP gNB. In a variant, a LP WTRU may receive the configuration information of protected resources from a transmission from its serving gNBs.

The LP gNB may be (e.g., directly) indicated the channel reservation message or channel protection configuration, by a HP gNB. Any technique for communicating the protected resource configuration to a LP gNB may be applicable to embodiments described herein.

LP WTRU Behavior

According to embodiments, LP WTRUs may be centrally controlled and LP WTRUs may know the protected information from the signaling, for example, broadcasted by the LP gNB. The broadcasted signaling may be, for example, any of the Physical Downlink Control Channel (PDCCH) and the Physical Broadcast Channel (PBCH). LP WTRUs may be scheduled for transmissions using any of dynamic and configured resource grants. A dynamic resource grant may be a signaling information indicating a resource is available for transmission only once, starting at a given point in time and for a given duration. A configured resource grant may indicate a resource may be repeatedly available for transmission for a given duration and with a given periodicity. In a first variant, LP WTRUs may be scheduled for transmissions using dynamic resource grants (e.g., only) in the protected duration. In that first variant, the LP gNB may take care of granting the resource in the protected duration. In a second variant, LP WTRUs may be scheduled for transmissions using configured resource grants and the configured grants may be conditional on occurring in protected resources. In that second variant, a LP WTRU may use configured grants for transmission only when they occur in the protected duration. According to any of the first or the second variant, when transmitting, the LP WTRUs may use a LP channel access method according to their configured operation mode and/or according to protected information of the broadcasted signaling.

According to embodiments, LP WTRUs may not be centrally controlled. In a first variant, LP WTRUs may (e.g., autonomously) detect when to abandon (stop transmitting in) a channel to avoid keeping the channel too long, which could be detrimental to HP WTRUs or HP gNBs. For example, during configurable and (e.g., periodic) time intervals, HP WTRUs may stop transmitting (if any transmission is ongoing) to assess the channel occupancy. In a first example, LP WTRUs may listen to broadcasts from the HP network. In a second example, LP WTRUs may perform measurements on the channel to determine the occupancy.

In a second variant, LP WTRUs may have a channel occupancy time limit that may be between one slot and an integer number N of slots. According to the second variant, LP WTRUs may free the channel for HP WTRUs once they have reached their channel occupancy time limit even if the channel reservation message has not been received correctly.

In a third variant, LP WTRUs may not receive the protected duration information in the message broadcasted by the LP gNB and/or HP gNB. Rather, they may keep sensing the channel to be able to access the reserved channel according to their configured LP channel access method. Furthermore, LP WTRUs may monitor for the presence of a pre-emption signal. Such a pre-emption signal may indicate to the LP WTRUs to abandon the channel, possibly also indicating the time when to abandon the channel. Any combination of the first, second and third variants may be applicable to embodiments described herein.

Figure 4:
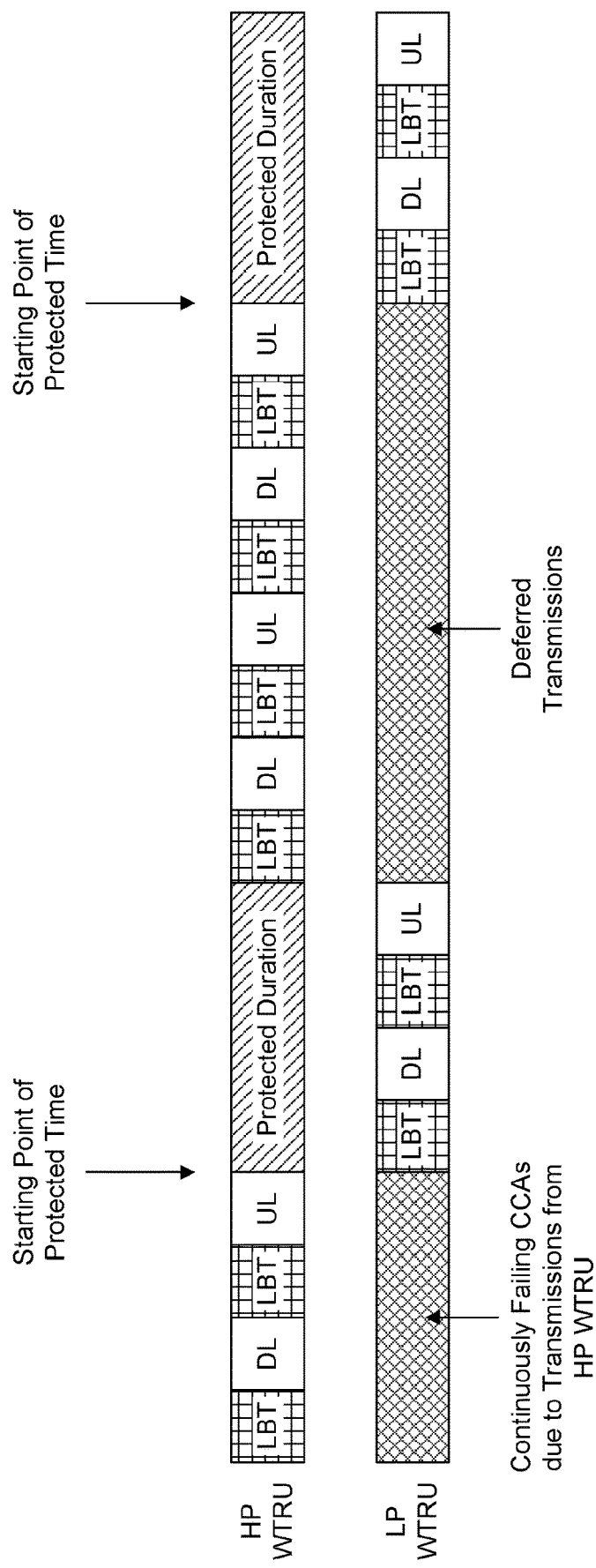
FIG. 4 illustrates an exemplary situation where the transmission of protected durations from a high priority network assists accessing the channel for a lower priority coexisting network according to an embodiment.

FIG. 4 illustrates an exemplary situation where the transmission of protected durations from a HP network assists in accessing the channel for a lower priority coexisting network. FIG. 4 shows an example where a LP WTRU may initially not be aware of the presence of an upcoming protected duration. In such a case, the LP WTRU may attempt to acquire the channel and may fail until the start of the first protected duration. Subsequently, the LP WTRU may receive an indication of a second upcoming protected duration. As such, the LP WTRU may defer (e.g., all) uplink transmissions (and monitored downlink transmissions) until the beginning of the protected duration. This may enable power savings for the LP WTRU.

HP WTRU Behavior

According to embodiments, during the protected durations, a HP gNB may defer transmissions to reserve the channel for LP WTRUs and/or LP gNB. Upon receiving the signaling of a network resource (e.g., spectrum) reservation from a HP gNB through signaling response messages in PBCH or PDCCH, HP WTRUs may fairly share the reserved network resources (e.g., the protected resources) with LP WTRUs and/or LP gNBs. Signaling response messages may, for example, be received by the HP WTRUs from their HP gNB in PBCH or PDCCH, based on the network/user devices signaling.

In a first variant, fair sharing of the protected resources by a HP WTRU may comprise deferring (e.g., all) transmissions during the protected time. This may allow LP WTRUs exploiting the protected resources to gain access to the wireless channel, for example, using a channel access method specific to protected resources (such as a LP channel access method).

In a second variant, fair sharing of the protected resources by a HP WTRU may comprise applying a lower priority channel access method (e.g. full LBT) to fairly compete for the channel with LP WTRUs. For example, HP WTRUs may be allowed to operate using a LP channel access method, in which the LP channel access method configuration may be received by any of Radio Resource Control (RRC) signaling, and using MAC Control Element (CE), e.g., in Random Access Response. HP WTRUs may switch back to a high priority channel access method (such as, for example, a direct channel access without any preliminary channel listening) after completion of the protected durations, as indicated by the RRC signaling. In another example, HP WTRUs may be informed dynamically of the type of access to use in any slot or group thereof. The LP channel access method assigned to HP WTRUs in the protected durations may be, for example, based on the indication from the signaling originated by the HP gNB.

The signaling message may also indicate to HP WTRUs the share or percentage of resources for which any of the HP WTRUs and HP gNBs may be in a muting duration or using a lower priority channel access method within the protected period. Such a share or percentage may, for example, indicate to any of the LP WTRUs and LP gNB the type of channel access method to use and the expected success rate. The share of resources may indicate to a LP WTRU that it may have (e.g., opportunistic) access to the channel (for example using a higher priority channel access method) until it reaches a limit indicated by the share or percentage, at which point, even if the protected duration has not fully elapsed, an LP WTRU and/or LP gNB may stop using the higher priority channel access method and use again a lower priority channel access. The amount of muting duration or lower priority channel access method duration may, for example, be determined by the network operator based on a negotiation between HP and LP network operators. In another example, the amount of muting duration or lower priority channel access method duration may be pre-determined (e.g., fixed).

Pre-Emption Signaling

According to embodiments, any of HP WTRUs and HP gNBs may transmit a pre-emption indication in the event any of HP WTRUs and HP gNBs want to access the channel without interferences from any of LP WTRUs and LP gNBs. Such a pre-emption indication may be used to indicate to any of LP WTRUs and LP gNBs to vacate (e.g., abandon) a (e.g., shared) channel. For example, such a pre-emption indication may be transmitted during a protected duration, possibly effectively ending (or temporarily aborting) an ongoing protected duration.

Figure 5:
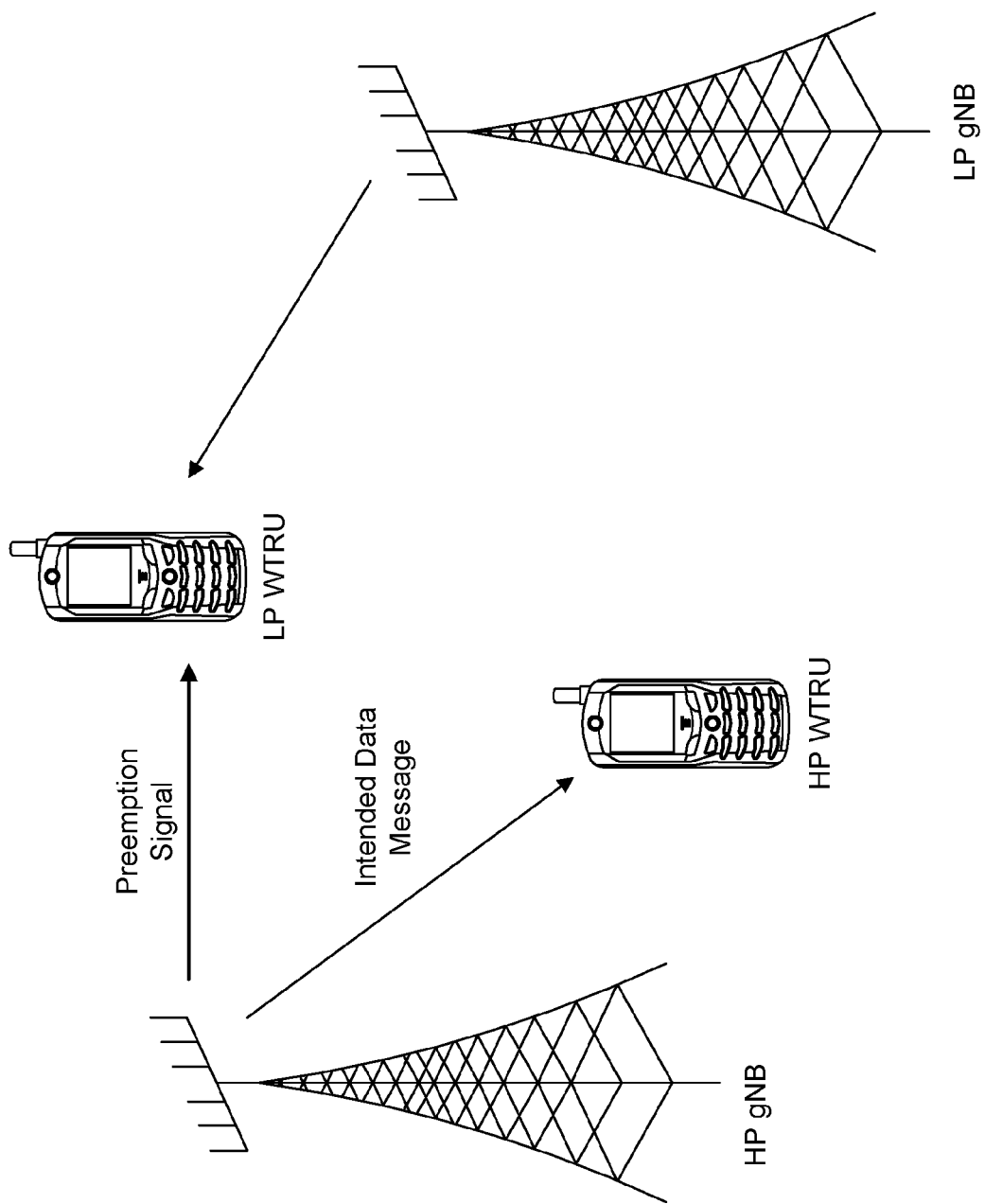
FIG. 5 illustrates an exemplary situation in which a pre-emption indication is transmitted to a low priority WTRU according to an embodiment.

FIG. 5 illustrates an exemplary situation in which a HP gNB aiming at transmitting an intended data message to a HP WTRU during a protected duration but without interfering with a LP WTRU, transmits a pre-emption indication to the LP WTRU for temporarily aborting the ongoing protected duration.

In a first variant, the pre-emption indication may comprise an information element indicating the set of resources that are no longer protected for any of LP WTRUs and LP gNBs. In a second variant, the pre-emption indication may comprise an information element indicating the duration of the pre-emption. The information element may, for example, indicate the duration for which the HP network may use the (e.g., shared) set of network resources with high priority setting. In a third variant, the pre-emption indication may comprise an information element indicating the channel access method to be used by any of LP WTRUs and LP gNBs on the pre-empted resources. A pre-emption indication comprising at least one information element according to any of the first, second and the third variants may be applicable to embodiments described herein.

Any of LP WTRUs, HP WTRUs and LP gNB may monitor a channel (e.g. PDCCH, PBCH) or a signal (e.g. Discovery Reference Signal) to determine if a transmission has been pre-empted by the HP network. In a first example, upon reception of the pre-emption indication, any of LP WTRUs and LP gNBs may abort any upcoming transmission and may vacate the channel. In another example, upon reception of a pre-emption indication, any of LP WTRUs and LP gNBs may abort any transmission performed with less stringent channel access methods (e.g., channel access methods of higher priority that may only be used on protected resources). Furthermore, any of the LP WTRUs and LP gNBs may attempt to re-acquire the (e.g., shared, protected) set of network resources, possibly using a more stringent (e.g., lower priority) channel access method. Upon reception of the pre-emption indication, HP WTRUs may attempt to acquire the (e.g., shared, protected) set of network resources using high priority channel access (e.g., any channel access method used outside of protected resources).

In some cases, LP WTRUs may not detect a pre-emption indication. This may, for example, happen when a LP WTRU is not in the range of the HP gNB transmitting the pre-emption indication. This may lead some LP WTRUs and/or LP gNBs to continue transmitting on the shared set of protected but pre-empted network resources with less stringent channel access methods, thus possibly affecting the ability of HP WTRUs and/or HP gNBs to acquire the channel and/or transmit. In such a situation, HP WTRUs may report (e.g., unexpected) interferences observed on a shared set of protected but pre-empted network resources. To that end, HP WTRUs may, for example, transmit a report message to their serving HP gNB.

In a first variant, the report message may comprise the channel access method used (or parameters thereof). In an example, the HP WTRUs may also report statistics on their channel access methods.

In a second variant, the report message may comprise the amount of energy detected from other devices, for example, using a Zero power Channel State Information Reference Signal (ZP-CSI-RS) technique. The WTRU may use network resources for which no signal is expected to be received from its serving gNB, for performing energy measurement to identify a potential interference.

In a third variant, the report message may comprise an identifier of the interfering node. For example, the report message may include a LP WTRU ID.

In a fourth variant, the report message may comprise broadcasted information from interfering nodes. For example, LP WTRUs and/or LP gNBs may broadcast information when transmitting opportunistically. Such a broadcasted information may be included in a preamble.

In a fifth variant, the report message may comprise an indication of the resources on which an interference has been detected. The indication may include any of frequency, time and spatial information. A report message comprising information according to any combination of the first, second, third and fourth variants may be applicable to embodiments described herein.

A report message according to any of the above variants may allow the HP gNB to determine the interference problems (e.g., collisions or failed transmissions originated by other HP WTRUs or other LP WTRUs) and improve the HP gNB detection of the source of interference from inside network or LP WTRUs.

Pre-Empting HP gNB and HP WTRUs Behaviors

According to embodiments, when a HP gNB receives a report message from at least one HP WTRU for reporting an unexpected interference with a LP WTRU on a shared but pre-empted network resource, the HP gNB may perform an action to mitigate the unexpected interference with the LP WTRU.

In a first variant, based on the report information received from HP WTRUs, the HP gNB may broadcast the pre-emption signal with higher power compared to the previous preemption signal transmission in order to increase the probability of detection by the interfering LP WTRU. The pre-emption indication may indicate that it is a retransmission. As such, upon reception of a retransmitted pre-emption indication, any of LP WTRUs and LP gNBs may further limit their ability to acquire the channel for the shared but pre-empted set of resources, to better protect any of HP WTRUs and HP gNBs. For example, any of a LP WTRU and LP gNB after having received a first pre-emption indication for a pre-empted duration, may not stop using the (e.g., shared, protected) set of network resources but may switch to a lower priority channel access method for further use of the (e.g., shared, protected) set of network resources. Upon receiving the retransmitted pre-emption indication, any of a LP WTRU and LP gNB, for example, may further decrease the priority level of the channel access method or stop any further use of the (e.g., shared, protected) set of network resources for the pre-empted duration.

In a second variant, based on the report information received from HP WTRUs, the HP gNB may transmit a pre-emption indication to any number of its served HP WTRUs. It may happen that some LP WTRUs are not reachable by HP gNBs but may interfere greatly with neighboring HP WTRUs. In such a case, the HP WTRUs receiving the pre-emption indication may relay the information to neighboring LP WTRUs. Relaying by a HP WTRU of a pre-emption indication received from a HP gNB (in broadcast or downlink transmission) may allow the indication to reach an interfering LP WTRU that could have not received the pre-emption indication. In a first example, the HP WTRUs may use sidelink to transmit to neighboring LP WTRUs. Sidelink may allow two WTRUs to exchange data directly without going through a gNB. In another example, the HP WTRUs may relay the pre-emption indication using resources configured by the HP gNB (for example, indicated in the pre-emption indication transmitted by the HP gNB). In another example, the HP WTRUs may transmit a preamble at the beginning of an upcoming transmission that may include the pre-emption indication. In another example, HP WTRUs may (e.g., autonomously) transmit and/or forward the pre-emption signal to nearby LP WTRUs without HP gNB requests. HP WTRUs may transmit a pre-emption indication at the same time and the same frequency as a data message scheduled by its serving HP gNB if the beams for these two messages do not interfere with each other. The pre-emption indication sent by HP WTRUs may be transmitted on a single beam if, for example, HP WTRUs know the specific interference source.

Figure 6:
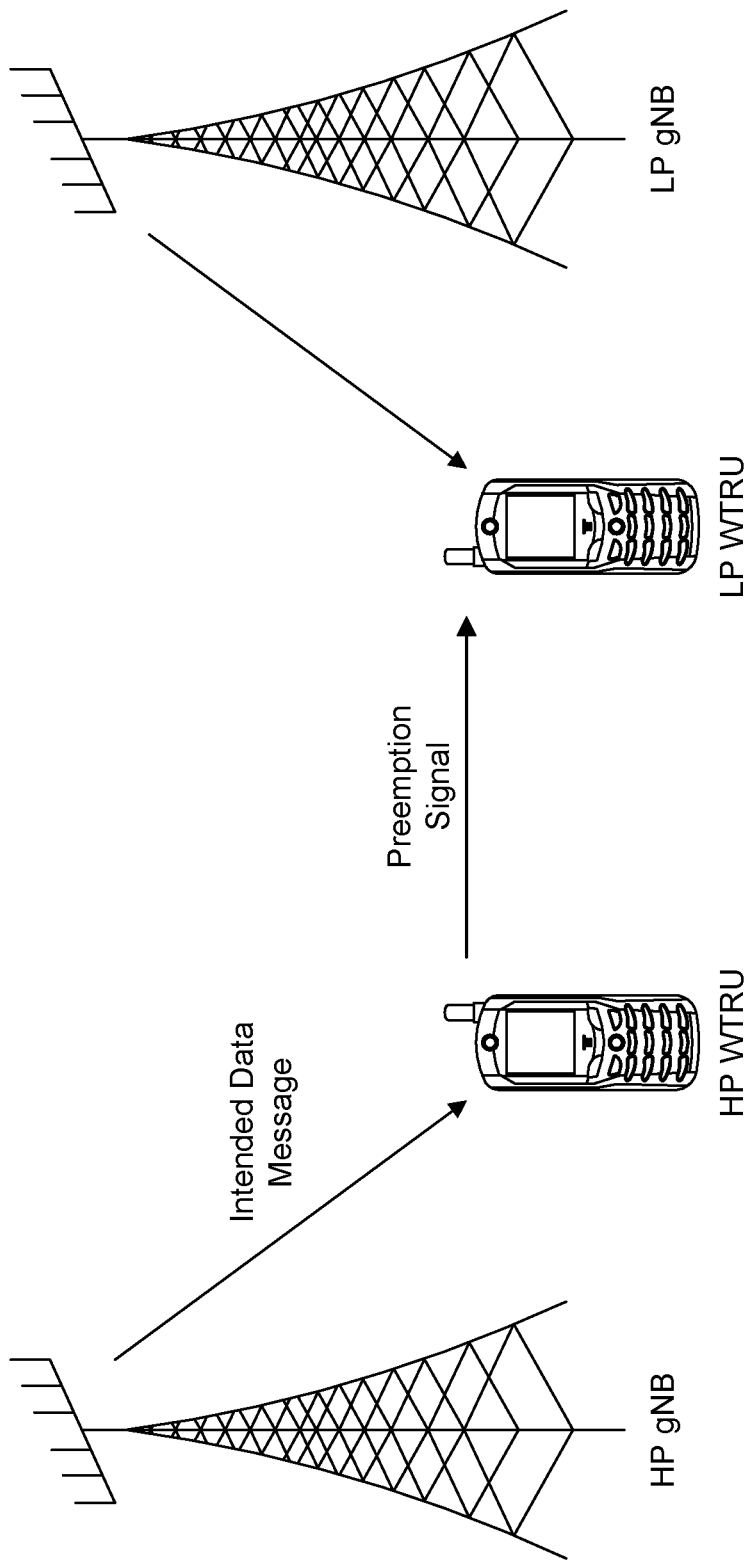
FIG. 6 illustrates an exemplary situation where a pre-emption indication is transmitted by a high priority WTRU to a neighboring low priority WTRU according to an embodiment.

FIG. 6 illustrates a situation where a pre-emption indication is transmitted by a HP WTRU to a neighboring LP WTRU. The transmitted pre-emption indication may be a relayed transmission of a pre-emption indication previously received from its serving gNB. In another example, the HP WTRU may (e.g., have decided to) transmit the pre-emption indication to a neighboring LP WTRU because, for example, the HP WTRU wants to transmit data in a protected duration without interfering with a LP WTRU.

Figure 7:
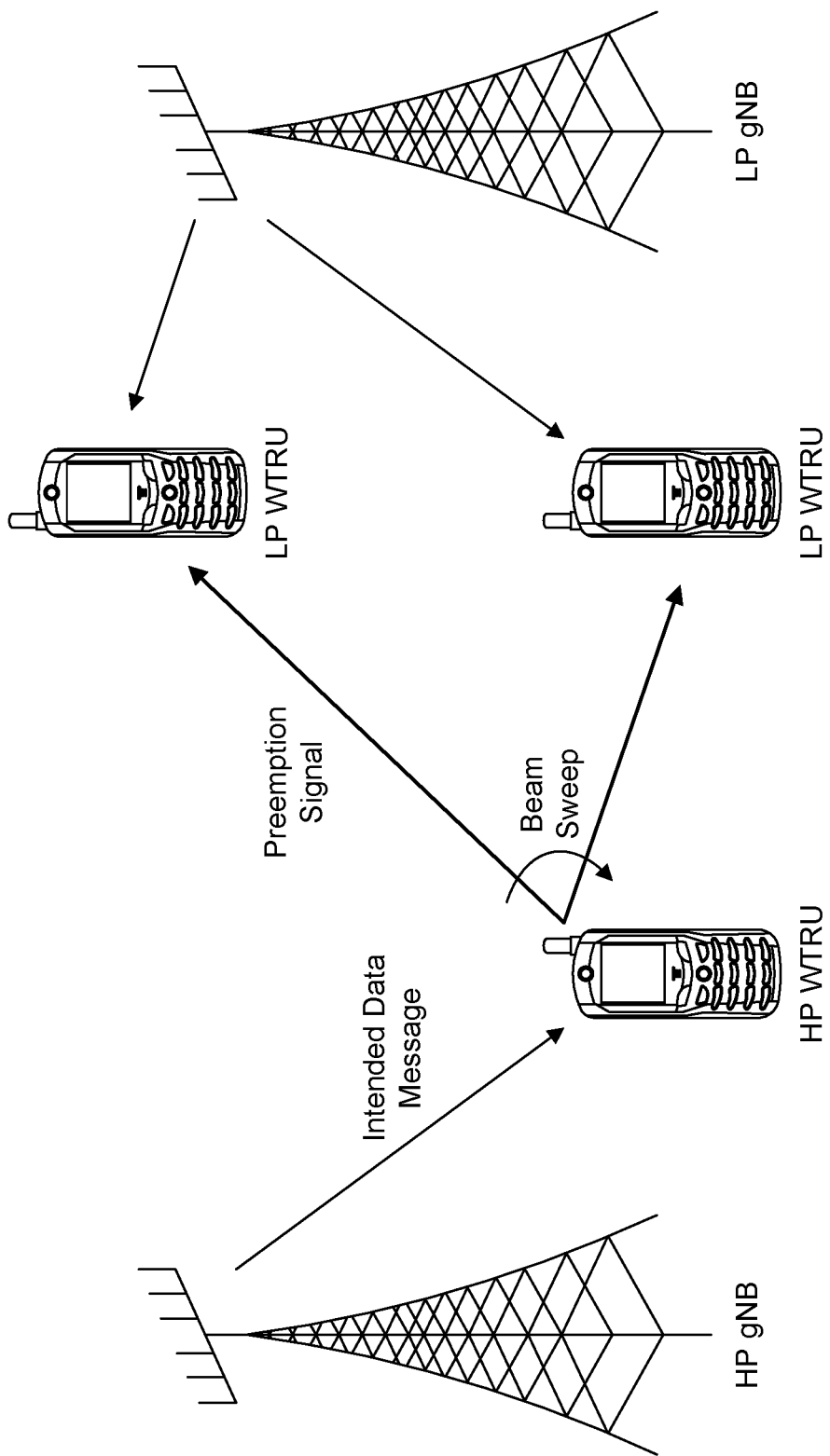
FIG. 7 illustrates an exemplary situation where a pre-emption indication is transmitted by a high priority WTRU to at least two neighboring low priority WTRUs according to an embodiment.

FIG. 7 illustrates a situation where a pre-emption indication is transmitted by a HP WTRU to at least two neighboring LP WTRUs by using beam sweeping. In the exemplary situation of FIG. 7, two LP WTRUs are interfering with the HP WTRU. Beam sweeping is a technique allowing transmission of a same signal over multiple different beams sequentially. Beam sweeping the pre-emption indication on multiple beams may allow an efficient delivery of a same pre-emption indication to several interfering LP WTRUs. In a variant, the different pre-emption signals may be adjusted with different power levels, for example, according to the distance detected from the corresponding interference sources.

Pre-Empted LP WTRU Behavior

According to embodiments, when a LP WTRU receives a pre-emption indication it may limit its interferences according to the information of the received pre-emption indication.

In a first variant, upon receiving a pre-emption indication, a LP WTRU may abort any ongoing transmission taking place in the pre-empted protected duration. The LP WTRU may, for example, wait for the next protected duration for resuming the transmission. In the resumed transmission, the LP WTRU may, for example, indicate a failure to transmit to its serving gNB due to a pre-emption of the protected duration.

In a second variant, upon receiving a pre-emption indication, a LP WTRU may abort any ongoing transmission taking place in the pre-empted protected duration, and may attempt to re-acquire the channel in the same (although pre-empted) protected duration, using a same or a lower priority channel access method. Aborting the transmission, despite the LP WTRU attempting to re-acquire the channel in the pre-empted duration may allow any of a HP WTRU and a HP gNB to successfully acquire the channel by using a higher priority channel access method.

In a third variant, upon receiving a pre-emption indication, a LP WTRU may complete any ongoing transmission and may use a lower priority channel access method for any upcoming (e.g., subsequent) transmission in the pre-empted protected duration. Any combination of the above variants may be applicable to embodiments described herein.

Pre-Emption Indication Signal Transmission Characteristics

During or after a protected duration or whenever the HP network wants to occupy the channel without interfering with any LP unit, a HP gNB may send out (e.g., transmit a signal comprising) a pre-emption indication According to embodiments, the pre-emption signal may be scheduled in any of (a) a broadcast message such as, for example, in the PBCH, (b) a control message such as, for example, in the PDCCH and (c) included within a data transmission such as, for example, in the Physical Downlink Shared Channel (PDSCH). The pre-emption signal may be transmitted with a default power.

An adaptation mechanism may increase the chance that LP WTRUs may detect the pre-emption indication and behave accordingly. For example, if a HP gNB receives a message reporting (e.g., indicating) interference problems from HP WTRUs, the HP gNB may repeat sending the pre-emption signal and/or indicate to any number of its HP WTRUs to relay the pre-emption signal with increasing transmit power and/or multiplexing multiple pre-emption indications with higher density transmission modes in multiple selected channels (e.g., any of PBCH, PDCCH and PDSCH). Using higher density transmission modes and transmitting the pre-emption indication in multiple slots may allow to improve the successful delivery of the pre-emption indication throughout the LP network.

LP WTRUs receiving a pre-emption indication may vacate the channel (or reduce activity on the channel, e.g. use the channel only for high priority transmissions) as previously described.

Figure 8:
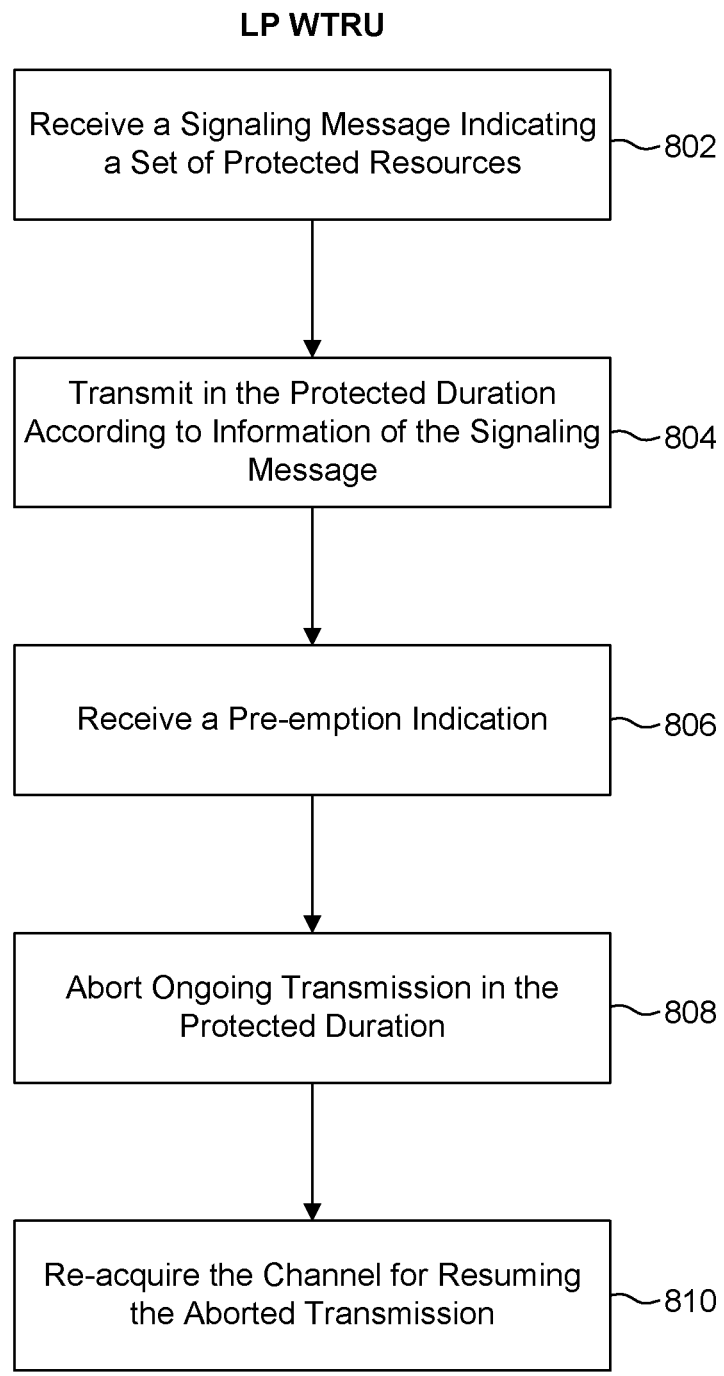
FIG. 8 describes an example of a method for use in a WTRU configured in a low priority mode according to an embodiment.

FIG. 8 describes a method for use in a WTRU configured in a low priority mode according to an embodiment. In a step 802 of the LP WTRU may receive a signaling message indicating a set of protected resources according to any embodiment and/or variant previously described. The signaling message may include information describing any of which network resources may be protected, a period of time (e.g., protected duration) over which the network resources are protected, and which channel access method may be allowed for using the protected resources in the protected duration. In a step 804 the LP WTRU may transmit data in the protected duration according to the received signaling message (for example, using the allowed channel access method) according to any embodiment and/or variant previously described. In a step 806 the LP WTRU may receive a pre-emption indication. The pre-emption indication may be received from a HP gNB or a HP WTRU as previously described. When such a pre-emption indication is received, any ongoing transmission in the protected duration may be aborted by the LP WTRU in the step 806. In a step 810 the LP WTRU may re-acquire the channel for resuming the aborted transmission. In a first variant, the channel may be re-acquired in the same protected duration for resuming the aborted transmission, for example, with a lower priority channel access method. In a second variant, the channel may be re-acquired in subsequent protected duration for resuming the aborted transmission.

According to embodiments, a WTRU may be configured with multiple sets of channel acquisition parameters (e.g., wherein a set of channel acquisition parameters may include any of a set of network resources and at least one channel access method, and parameters thereof, for accessing the set of network resources). The WTRU may be configured with time instances (e.g., periods of time, time intervals) during which each set of channel acquisition parameter may be valid. A WTRU may, for example, be configured with two sets of channel acquisition parameters, a first set being the channel acquisition parameters to be used by the WTRU by default (e.g., outside of any protected duration), and a second set corresponding to the channel acquisition parameters to be used in protected durations. The second set of channel acquisition parameters may include a channel access method of higher priority or a channel access method with higher probability of acquiring the channel, than the default channel access method. Upon performing a transmission, the WTRU may select the (e.g., appropriate) set of channel acquisition parameters based on the timing of the transmission. For example, if the transmission is occurring in the protected duration the WTRU may use the channel access method of the second set of channel acquisition parameters. Otherwise, (e.g., if the transmission is occurring outside of the protected duration) the WTRU may use the default channel access method. If the WTRU receives a pre-emption signal, the WTRU may use (e.g., switch back to) the default channel acquisition parameters, for example for a time period, or up to a point the next protected duration is being scheduled again.

Figure 9:
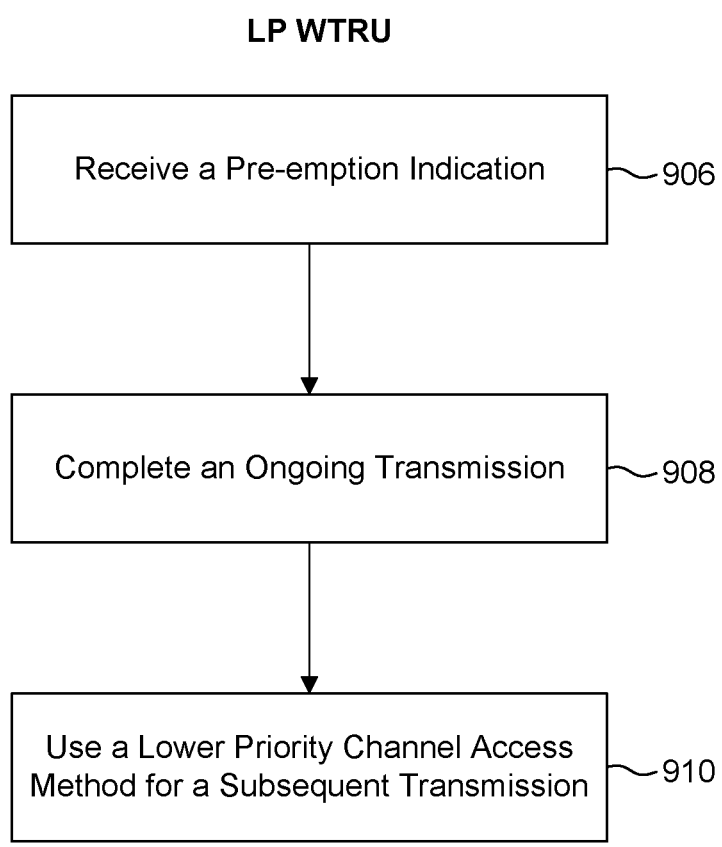
FIG. 9 describes another example of a method for use in a WTRU configured in a low priority mode according to an embodiment.

FIG. 9 describes another method for use in a WTRU configured in a low priority mode according to an embodiment. In a step 906 a WTRU, for example, currently transmitting in a protected duration, may receive a pre-emption indication. In a step 908, the WTRU may complete the ongoing transmission, despite having received the pre-emption indication. In a step 910, the WTRU may use a lower priority channel access method for a subsequent transmission in the protected (but pre-empted) duration. Although the LP WTRU may have been allowed to use a higher priority channel access method within the protected duration, when the WTRU receives a pre-emption indication for that protected duration, the WTRU may no longer be allowed to use any higher priority channel access method than the low priority channel access method e.g., used outside of the protected duration (e.g., full LBT).

Figure 10:
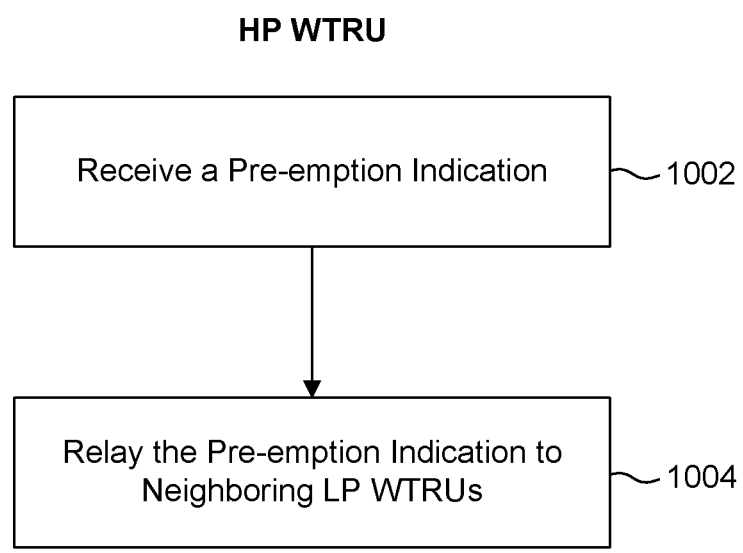
FIG. 10 describes another example method for use in a WTRU configured in a high priority mode according to a an embodiment.

FIG. 10 describes another method for use in a WTRU configured in a high priority mode according to an embodiment. In a step 1002 a pre-emption indication may be received by the HP WTRU, for example, from the serving HP gNB. In a step 1004, the HP WTRU may relay (e.g., retransmit) the pre-emption indication to at least one neighboring LP WTRU, according to any embodiment and/or variant previously described.

CONCLUSION

While not explicitly described, the present embodiments may be employed in any combination or sub-combination. For example, the present principles are not limited to the described variants, and any arrangement of variants and embodiments can be used. Moreover, the present principles are not limited to the described channel access methods and any other type of channel access methods with different priority levels is compatible with the present principles.

Besides, any characteristic, variant or embodiment described for a method is compatible with an apparatus device comprising means for processing the disclosed method, with a device comprising a processor configured to process the disclosed method, with a computer program product comprising program code instructions and with a non-transitory computer-readable storage medium storing program instructions.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU 102, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the representative embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (e.g., but not always, in that in certain contexts the choice between hardware and software may become significant) a design choice representing cost vs. efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments only, and is not intended to be limiting. As used herein, when referred to herein, the terms "station" and its abbreviation "STA", "user equipment" and its abbreviation "UE" may mean (i) a wireless transmit and/or receive unit (WTRU), such as described infra; (ii) any of a number of embodiments of a WTRU, such as described infra; (iii) a wireless-capable and/or wired-capable (e.g., tetherable) device configured with, inter alia, some or all structures and functionality of a WTRU, such as described infra; (iii) a wireless-capable and/or wired-capable device configured with less than all structures and functionality of a WTRU, such as described infra; or (iv) the like. Details of an example WTRU, which may be representative of any UE recited herein, are provided below with respect to FIGS. 1A-1D.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶6 or means-plus-function claim format, and any claim without the terms "means for" is not so intended.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used m conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

Throughout the disclosure, one of skill understands that certain representative embodiments may be used in the alternative or in combination with other representative embodiments.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WRTU, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits.

The data bits may also be maintained on a computer readable medium including magnetic disks, optical disks, and any other volatile (e.g., Random Access Memory ("RAM")) or non-volatile ("e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method for use in a wireless transmit/receive unit (WTRU), the method comprising:
   receiving first configuration information indicating a first channel access method associated with a first priority to be used during at least a first duration;
   receiving second configuration information indicating a second channel access method associated with a second priority to be used during a plurality of second durations, the second priority being of higher priority than the first priority;
   monitoring for a pre-emption signal in one second duration of the plurality of second durations; and
   on a condition that the pre-emption signal is received in the monitored second duration, accessing a channel in the monitored second duration using a third channel access method associated with a third priority, in accordance with the pre-emption signal, the third priority being of a lower priority than the second priority.

2. The method according to claim 1, wherein said second configuration information indicates that:
   (1) a set of resources is associated with the second channel access method; and
   (2) the set of resources is scheduled in the monitored second duration.

3. The method according to claim 2, wherein said second configuration information is received in a broadcast transmission from at least one gNB of higher priority than a serving of gNB of the WTRU.

4. The method according to claim 2, wherein the pre-emption signal comprises information indicating any of pre-empted resources in the set of resources, a pre-emption duration and a channel access method to be used on the pre-empted resources.

5. The method according to claim 1, further comprising aborting a current transmission in the monitored second duration after receiving the pre-emption signal.

6. The method according to claim 5, wherein accessing the channel in the monitored second duration using the third channel access method associated with the third priority is for resuming the aborted transmission.

7. The method according to claim 5, wherein the channel is accessed in a subsequent occurrence of the plurality of second durations using the second channel access method.

8. The method according to claim 1, wherein:
   the first channel access method comprises transmitting after a first listen before talk (LBT) operation of a first type associated with the first priority;
   the second channel access method comprises transmitting after a second LBT operation of a second type associated with the second priority or transmitting without a LBT operation associated with said transmitting; and
   the third channel access method comprises transmitting after a third LBT operation of a third type associated with the third priority.

9. The method according to claim 8, wherein any of the first and the third types of LBT correspond to a full LBT.

10. The method according to claim 1, wherein the first and the third channel access methods are a same channel access method, and the first priority is a same priority as the third priority.

11. A wireless transmit/receive unit (WTRU) comprising a processor and a transceiver operatively coupled to the processor, the processor being configured to:
   receive first configuration information indicating a first channel access method associated with a first priority to be used during at least a first duration;
   receive second configuration information indicating a second channel access method associated with a second priority to be used during a plurality of second durations, the second priority being of higher priority than the first priority;
   monitor for a pre-emption signal in one second duration of the plurality of second durations; and
   on a condition that the pre-emption signal is received in the monitored second duration, access a channel in the monitored second duration using a third channel access method associated with a third priority, in accordance with the pre-emption signal, the third priority being of a lower priority than the second priority.

12. The WTRU according to claim 11, wherein said second configuration information indicates that:
   (1) a set of resources is associated with the second channel access method; and
   (2) the set of resources is scheduled in the monitored second duration.

13. The WTRU of claim 12, wherein said second configuration information is received in a broadcast transmission from at least one gNB of higher priority than a serving gNB of the WTRU.

14. The WTRU according to claim 12, wherein the pre-emption signal comprises information indicating any of pre-empted resources in the set of resources, a pre-emption duration and a channel access method to be used on the pre-empted resources.

15. The WTRU according to claim 11, wherein a current transmission is aborted in the monitored second duration after receiving the pre-emption signal.

16. The WTRU according to claim 15, wherein the channel is accessed in the monitored second duration using the third channel access method associated with the third priority for resuming the aborted transmission.

17. The WTRU according to claim 11, wherein the channel is accessed in a subsequent occurrence of the plurality second durations using the second channel access method.

18. The WTRU according to claim 11, wherein:
   the first channel access method comprises a transmission after a first listen before talk (LBT) operation of a first type associated with the first priority;
   the second channel access method comprises a transmission after a second LBT operation of a second type associated with the second priority or transmitting without a LBT operation associated with said transmitting; and
   the third channel access method comprises a transmission after a third LBT operation of a third type associated with the third priority.

19. The WTRU according to claim 18, wherein any of the first and the third types of LBT correspond to a full LBT.

20. The WTRU according to claim 11, wherein the first and the third channel access methods are a same channel access method, and the first priority is a same priority as a third priority.

* * * * *